April 23, 1957   H. B. SCHRAMM   2,789,357
DUAL DRIVE TUBING CALIPER

Filed Nov. 10, 1953   5 Sheets-Sheet 1

INVENTOR.
HARRY B. SCHRAMM
BY Robert O. Spindle
ATTORNEY

INVENTOR.
HARRY B. SCHRAMM
BY
Robert O. Spindle
ATTORNEY

April 23, 1957  H. B. SCHRAMM  2,789,357
DUAL DRIVE TUBING CALIPER
Filed Nov. 10, 1953  5 Sheets-Sheet 3

INVENTOR.
HARRY B. SCHRAMM
BY
Robert O. Spindle
ATTORNEY

April 23, 1957 H. B. SCHRAMM 2,789,357
DUAL DRIVE TUBING CALIPER
Filed Nov. 10, 1953 5 Sheets-Sheet 4

*INVENTOR.*
HARRY B. SCHRAMM
BY Robert O. Spindle
ATTORNEY

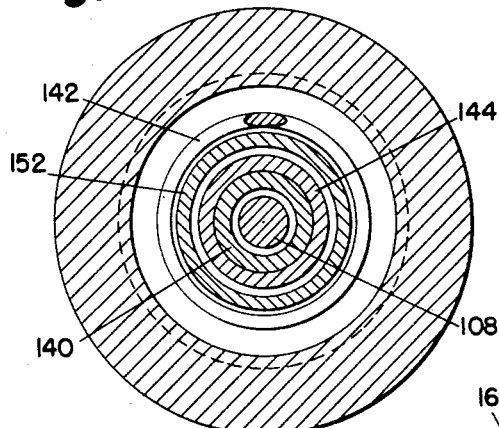
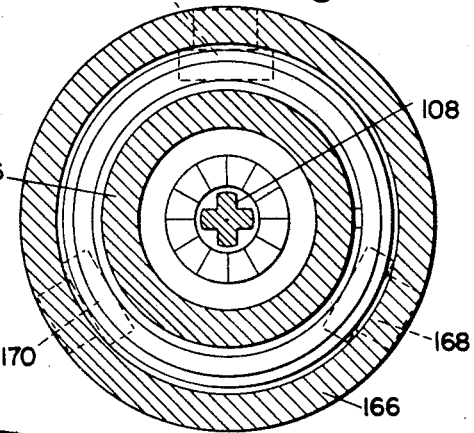
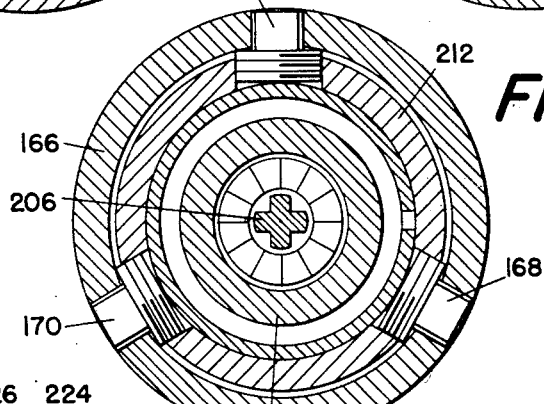
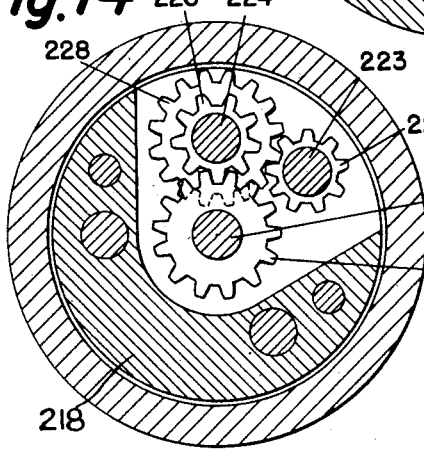
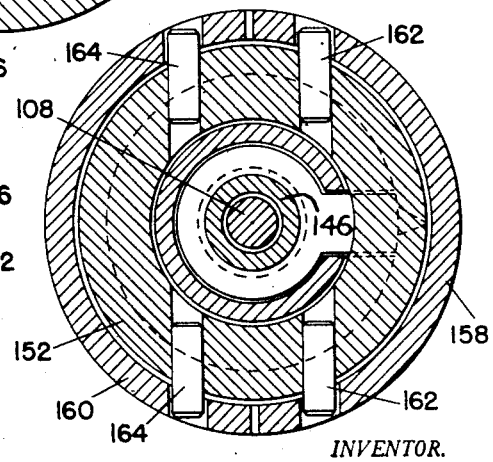

United States Patent Office 2,789,357
Patented Apr. 23, 1957

2,789,357

DUAL DRIVE TUBING CALIPER

Harry B. Schramm, Dallas, Tex., assignor to Otis Pressure Control, Inc., Dallas, Tex., a corporation of Delaware Application November 10, 1953, Serial No. 391,304

8 Claims. (Cl. 33—178)

The present invention relates in general to tube calipering devices, and more particularly to calipering devices suitable for use in short length of tubing such as in stock piles and supplies at derrick site requiring inspection before use.

Tubing or casing used in the production of gas and oil is subjected periodically to calipering operations to determine further usefulness. Apparatus designed to measure the thickness of tubing and casing as it stands in a well bore hole has been disclosed as shown in Patent Number 2,596,924, issued to J. V. Fredd, and like patents. However, this and similar calipers are specifically constructed for use in connected lengths of tubing extending for distances measured in thousands of feet and are not adaptable for calipering of tubing in short lengths. It is an object of this invention to disclose a recording caliper adapted to caliper the entire length of a separate piece of tubing.

In the calipering operation of the class of mechanisms shown in the noted patent, movement of the recording elements is the result of transmitted motion of a friction drive wheel mounted at a convenient location on the caliper housing. Such a device is incapable of calipering the full length of a tube because of the lost space between the surface feelers and the chart driving elements. It is, therefore, a further object of this invention to disclose a caliper recording mechanism which will continue the calipering function throughout the tubing length and eliminate lost spaces.

Other objects and advantages of this invention will be apparent in the course of the detailed description which follows, taken with the accompanying drawings, in which:

Figure 11 is a cross-section of Figure 4 taken on line 11—11.

Figure 12 is a cross-section of Figure 5 taken on line 12—12.

Figure 13 is a cross-section of Figure 5 taken on line 13—13.

Figure 14 is a cross-section of Figure 6 taken on line 14—14.

Figure 15 is a cross-section of Figure 5 taken on line 15—15.

Figure 1:
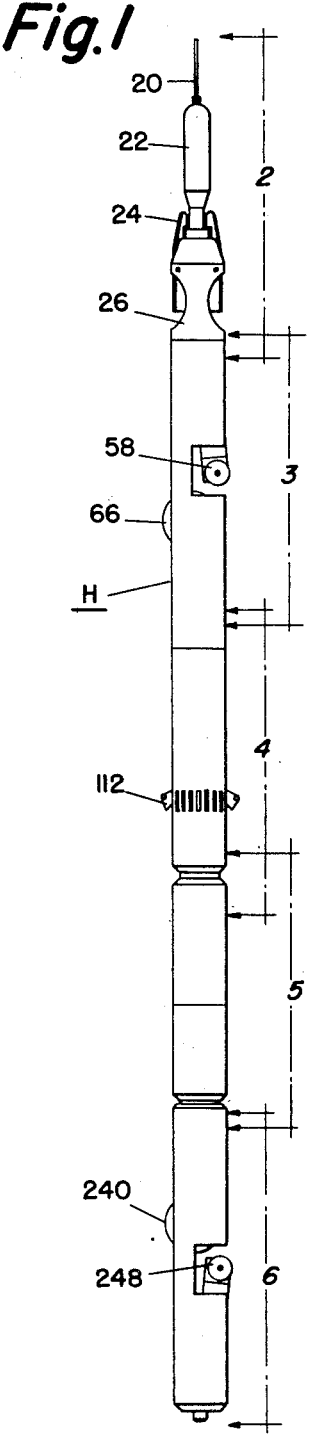
Figure 1 is an elevation of the calipering device.

The complete calipering instrument is shown in elevation in Figure 1 as it appears ready for insertion in a length of tubing. For ease of description and ready understanding, the caliper is pictured in a vertical position with an operating line 20 fastened to a quick-engaging coupler 22 at the top. This conventional picture does not mean that the device must be used vertically as the only operating position, for it will be shown later that horizontally positioned tubing or tubing sloping between vertical and horizontal positions are as readily calipered.

Figure 2:
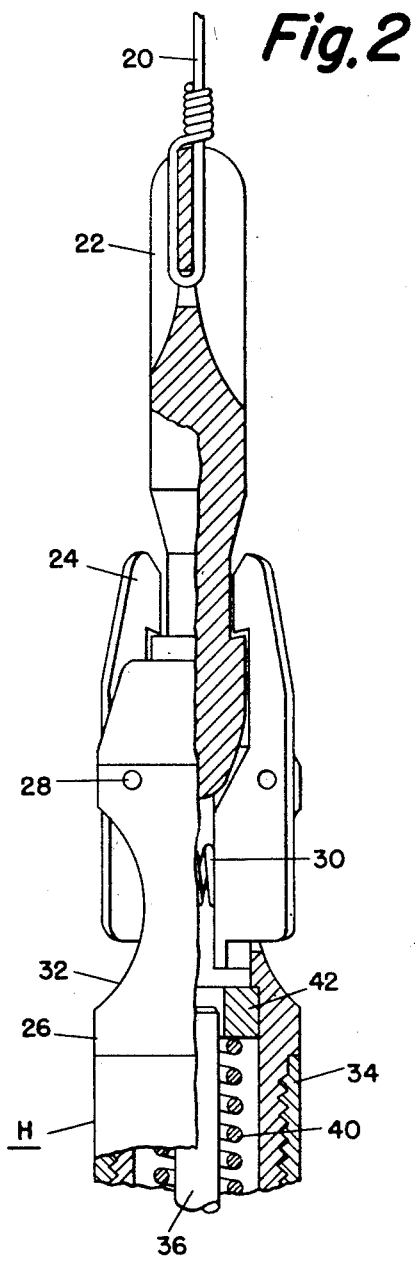
Figure 2 is a sectional elevation of that portion of Figure 1 between lines 2—2.

A spring-urged engaging means such as the dogs 24 spaced about the head 26 of the caliper body or housing H is pivotally supported as at 28, detailed in Figure 2. The spring 30 is positioned to separately urge each dog into the holding position on the coupler 22. The head 26 is machined as at 32 to assist in the engaging and releasing operation. By making the operating line 20 from standard wire line used in well operations, the coupler 22 can be readily passed through tubes of the length to be calipered for easy operation.

The brackets with numeral designations placed adjacent Figure 1 show the separate lengths included in figures of the drawing detailing these sections of the instrument. In every case, where applicable, the figures are drawn to overlap. The brackets show the approximate amount of overlap in each instance. By drawing the figures in this way, continuity of description is possible which greatly simplifies the understanding of the device, and also affords ready indication of the novelty and advantages of the structure.

Figure 3:
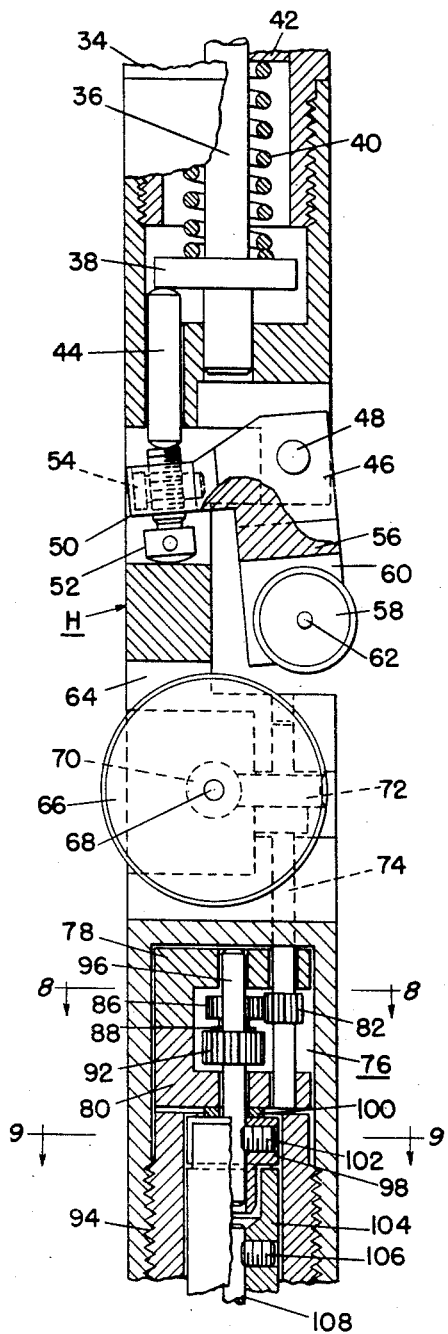
Figure 3 is a sectional elevation of that portion of Figure 1 between lines 3—3.

Referring again to Figures 1 and 2 and also Figure 3, all included in section 3 of the housing H, the first or head-end driving mechanism for the chart operation will be considered. The connecting joint 34 between sections 2 and 3 is made by threading as shown, or similar engaging means. A piston 36, flanged at 38, is urged longitudinally of the housing by the compression spring 40 arranged to abut against the bushing 42. A transfer rod 44, displaced toward the periphery of the housing H, engages the flange 38 and transmits the motion of piston 36 to a bell-crank lever or loading arm 46 arranged to assist the frictional operation of the chart drive mechanism.

Bell crank lever 46 is connected to the housing H by the dowel pin or pivot 48 located at its fulcrum. The inwardly extending arm 50 of the loading arm 46 is positioned transverse the housing from the pivot 48 to engage the transfer rod 44. An adjusting screw 52, threaded into the inwardly extending arm 50, is adjustable against the transfer rod 44 to raise or lower the bell crank lever 46 to set the stop position and minimize the disturbance of the caliper in passing through maximum depressions such as collar recesses. A cap screw 54 applies pressure against the adjusting screw 52 to lock it in place when the desired position of the bell crank lever 46 is obtained.

On the outwardly extending arm 56 of the bell crank lever 46, loading wheel 58 is fastened in the slot 60 by the axle 62. The axle 62 is positioned in the outwardly extending arm 56 to place the loading wheel 58 outwardly of the slot 60 to engage the tubing wall for any adjustment of the bell crank lever 46. Rolling contact for all pressures is assured.

Immediately below the loading wheel 58 within slot 64 in the housing, a head-end drive wheel 66 is mounted on its axle 68. The diameter of the wheel 66 and the position of the axle 68 are arranged to project the wheel from the caliper housing H sufficiently to frictionally engage the inner tubing wall in rotating contact. The slot 64 is further tooled to permit a worm 70 to be mounted for rotation on the axle 68. An extension of slot 64 positions a worm gear 72 and shaft 74 for operating engagement with the worm 70. The shaft 74, fixed in the worm gear 72 for rotation together, is longitudinally extended through the caliper housing into the transmission 76.

Figure 8:
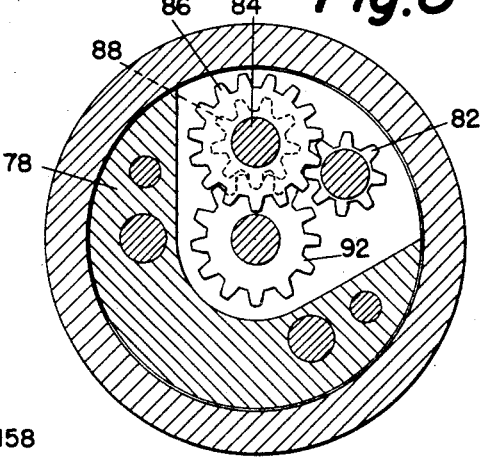
Figure 8 is a cross-section of Figure 3 taken on line 8—8.

A break is made in the housing at this point between sections 3 and 4 to open the transmission 76 fully. To make the gear train readily interchangeable by removing and inserting gears of different operating ratios indicated in Figure 8, opposed mounting plates 78 and 80, forming a gear cage, position gears 86 and 88 (Fig. 8) on intermediate shaft 84 to engage and transmit proportioned motion from the drive gear 82 to the driven gear 92. The threaeded joint 94 between sections 3 and 4 makes these gear ratio changes easy to accomplish and also makes the head-end driving coupling easily accessible, yet retains it as a rigid part of the housing.

Figure 9:
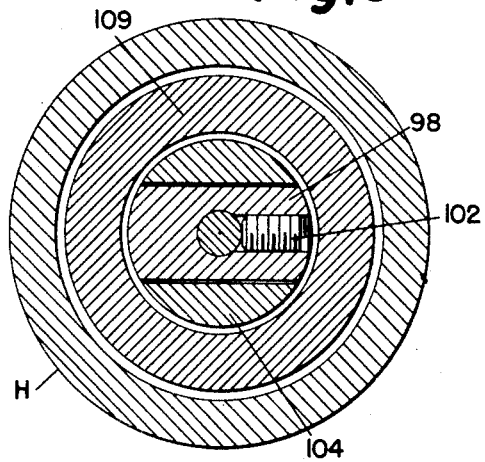
Figure 9 is a cross-section of Figure 3 taken on line 9—9.

The lower end of the shaft 96, to which driven gear 92 is fixed, projects through the lower gear mounting plate 80 to engage one member 98 of a separable connection shown in section in Figure 9. Member 98 is attached to shaft 96 by set screw 102, and is shaped to fit into a bifurcated member 104 positioned below it. Maybe 104 is fastened to the first drive shaft 108 by set screw 106 and thus transmits motion but is easily separated at this point of disassembly.

Section 3 detailed above includes all the elements necessary for driving the later described chart mechanism from the head end, and is properly designated the head-end driving assembly. It starts with the spring-pressed loading wheel 58 and stops with one-half of the separable connection 98. The next section, number 4, is designated the feeler head as it supports the feelers which perform the calipering operation and is shown in detail in Figure 4 of the drawing. In addition to the feelers, it includes the elements necessary to transmit the operating power from the head-end driving assembly to the chart assembly in section 5, and also to transmit the feeler movement to the chart.

Figure 4:
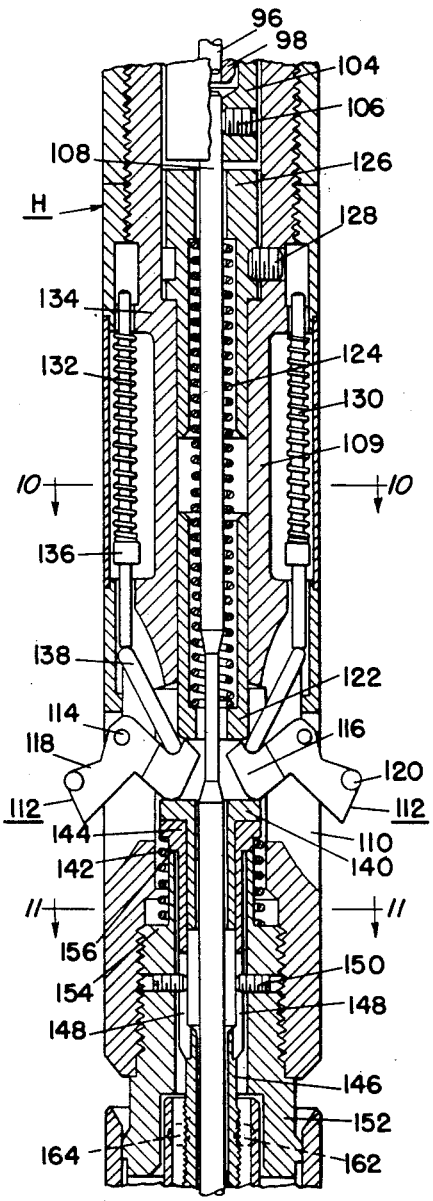
Figure 4 is a sectional elevation of that portion of Figure 1 between lines 4—4.

Beginning with the bifurcated member 104 of the separable connection positioned to engage the member 98 shown in Figures 4 and 9, set screw 106 locks member 104 to the first drive shaft 108 as noted above. This shaft 108 is positioned concentrically of the housing H and extends through the length of the feeler head section beginning at the member 104. Approximately midway of this section, numbered 4 on Figure 1, the body portion 109 is slotted as at 110 to permit the feelers 112 to extend into radial contact with the tubing wall.

These feelers 112 are uniform in size and shape and are pivotally suspended as at 114 within the housing. Bell-crank in shape, they include inwardly and outwardly extending arms 116 and 118 adapted to obtain and transmit calipering information to the chart mechanism from the surface they engage. A contact tip 120 of long wearing metal, shaped to compromise wear with sensitivity, readily enters the specific form of pit or indentation usually experienced in the surface under investigation, and forms the engaging portion of the outwardly extending arm 118. Further, the shape of this section of the feeler is determined by the shape of the body H through which it projects and the distance it projects outwardly, giving ease of calipering operation in all positions.

Inwardly the arm 116 extends to engage several surfaces of elements which respond to the feeler movement, and is shaped to most efficiently cooperate with these responsive elements. A centering plunger 122 is concentrically arranged relative to the drive shaft 108 and is free to move longitudinally in contact with the inwardly extending arms 116 of the feelers 112. This centering plunger 122 is constantly urged into contact with the feelers 112 by the centering spring 124 pivotally urging the feelers outwardly to their maximum extended position. Centering spring 124 is held in position by the drive shaft 108 which it encloses and by the retainer 126. By abutting in the retainer 126, the spring is held in operating position for movement of the sleeve 122, as the retainer 126 is held immovable in the housing by the set screw 128.

Figure 10:
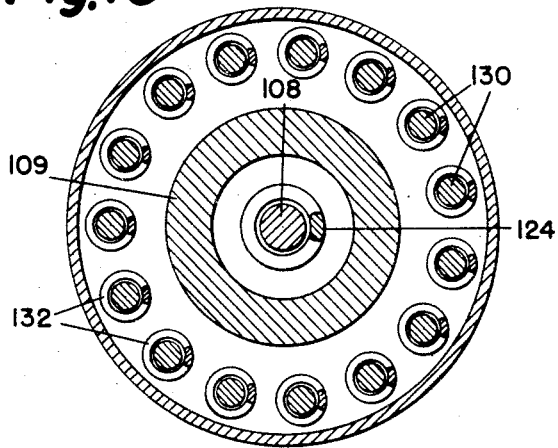
Figure 10 is a cross-section of Figure 4 taken on line 10—10.

In addition to the outward urging of all feelers 112 by the spring-urged action of the centering plunger 122, each separate feeler is independently urged outwardly by the peripherally disposed spring guides 130 (Fig. 10) moved in response to the feeler springs 132. The springs 132 abut the housing H as at flange 134 and engage another flange 136 on the spring guide 130. A transfer of direction is given to this longitudinal motion to be effective on the feeler arms by the feeler rods 138. By placing the spring guides 130 as near the periphery of the caliper housing as possible a greater number of and/or larger elements can be used with a resultant increase in calipering accuracy.

Below the inwardly extending arm 116 of the feeler 112, the stylus rod cap 140, urged upwardly by the stylus lift spring 142, opposes the force of the centering spring 124 and the feeler springs 132. The feelers 112 are thus positioned for calipering and the stylus, through the stylus rod cap, maintained in operating contact with the inwardly extending arms 116 of the feelers.

In the figure now being described, the feeler 112 is shown urged outwardly to the maximum distance, causing the stylus rod cap 140 to be depressed into contact with the upper end of section 5. By this form of construction, the only force unbalanced in the feeler operation is substantially the force of the independent peripherally arranged feeler springs 132. Thus, independent movement of each feeler can be transmitted for chart operating purposes. This will be fully understood after reading a description of the operation of the device.

Figure 5:
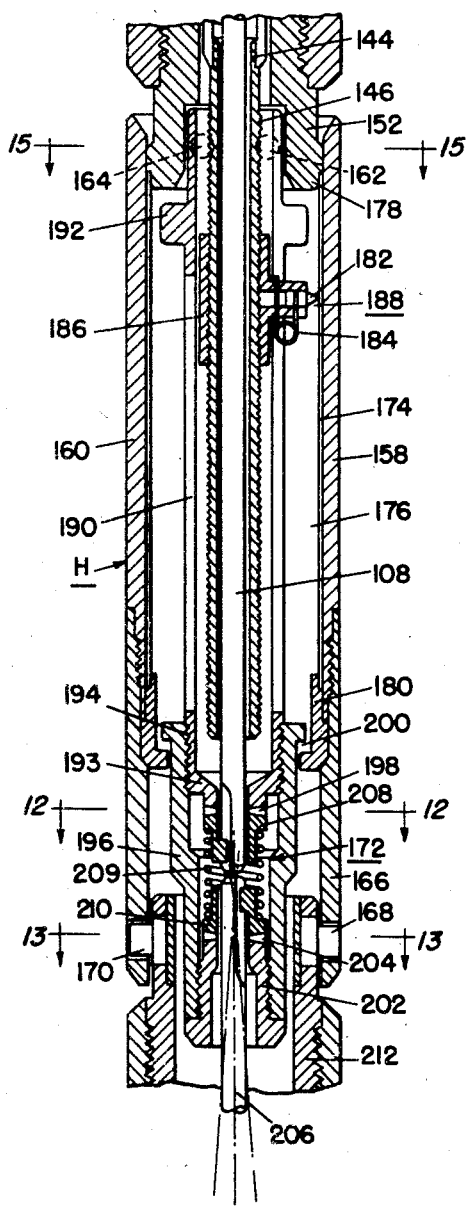
Figure 5 is a sectional elevation of that portion of Figure 1 between lines 5—5.

The drive shaft 108 passes through the stylus rod cap 140 with sufficient clearance to permit free reciprocation. A stylus rod 144 forms the abutment for spring 142 and carries the feeler stylus rod cap 140. Forming part of the stylus rod 144 and extending downwardly is the lead screw 146, used for transmitting reciprocal movement in response to the separate feeler operation. As shown in Figures 5 and 15 the lead screw is hollow, permitting the head-end drive shaft 108 to pass freely through it. Slots 148 are milled in the stylus rod 144 to receive dowel pins 150 which prevent rotation of said stylus rod, but permit ready reciprocation. This is evident by reference to the sectional view shown in Figure 4.

Figure 7:
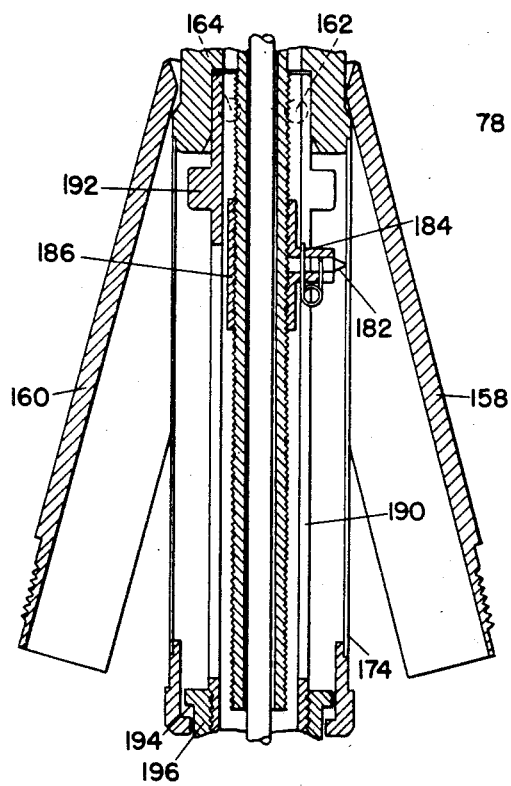
Figure 7 is a further detail of the operating features of Figure 5.

For maintenance purposes and to make the reciprocable elements of the device easily accessible, the housing is jointed at this point separating sections 4 and 5. The stylus bushing 152 projecting from section 5 into section 4 is adapted to provide an abutting surface 154 for the stylus lift spring 142 and a stop 156 below which the stylus rod cannot be depressed. The reason for this joint structure between the feeler head and the chart chamber will be understood from the description of the means used to make the chart chamber easily accessible, as shown in Figures 5, 7 and the cross-section shown in Figure 15.

Through benefit of the joint structure in the body of the housing described as located where the chart chamber joins the feeler head, the housing is divided into movable halves 158 and 160 of the chart chamber. These separable parts of the housing may be closed for the calipering operation, as shown in Figure 5, or opened for changing the chart sheet, as indicated in Figure 7. The separable halves 158 and 160 are pivotally connected to the stylus bushing 152 by pivot connections 162 and 164 clearly shown in Fig. 15. The lower end of each half is threaded to be engaged by a retaining collar 166, the lower end of which is flexibly connected to the male connector 212 by means of the connector pins 168, 169 and 170 further detailed in Figure 13. Collar 166 also covers the double clutch generally indicated by the numeral 172 and connects sections 5 and 6 on each end of the clutch.

Flexibility of the device at the locus of the clutch means by use of connector pins 168, 169 and 170 (Fig. 13) is indicated on Figure 5 by the convergent center lines. This form of joint is used at this point to permit as much independent action as possible between the feeler assembly and the tail-end drive to be described later. Relative independent operation of the feeler assembly developes maximum sensitivity and accuracy of the charts. The degree of relative independent operation can be controlled by regulating the depth of the connector pins 168 and 170 during assembly of the mechanism.

A chart 174, which is normally made of flexible metal with a treated surface, is held in fixed position in the chart chamber 176 between the upper retaining groove 178 of stylus bushing 152 and the lower chart retainer 180. Both retaining means are adapted to fit immovably, in the body of the housing, held securely at the joints between adjoining sections, and thus hold the chart firmly against rotation. Positioned to engage the treated surface of the chart, a stylus 182 is urged into chart contact by the stylus spring 184, both being held in the stylus holder 186. The lead screw portion 146 of the stylus rod 144 is threaded throughout the length of the chart chamber 176 and threadedly engages the stylus holder 186.

It has been stated above in relation to describing the stylus rod 144 and its connections with the feeler head, detailed as section 4, that the stylus rod is fixed against turning and is movable longitudinally of the caliper housing in response to feeler movement. Consequently, the stylus assembly generally indicated as number 188 and shown in threaded engagement with the stylus rod will reciprocate as the feelers operate regardless of its position in the chart chamber 176. However, to cause the stylus to rotate and move downwardly in the chamber as a result of the driving mechanisms operation, yet to be completely described, additional structure is necessary.

In Figures 5 and 7, the stylus assembly is shown projecting through a slot 190 in a rotatable drive frame 192. This frame is slotted to permit the stylus assembly 188 to move the full length of the sensitive surface of chart 174. As the sleeve is rotated by a clutch mechanism as the head and tail-end drive wheels are frictionally rotated, the stylus assembly is moved the length of the chamber on the threaded stylus rod and rotated to scribe a helical line broken by the reciprocative movement caused by the feeler operation.

As shown here, in Figure 5 particularly, one end of the rotatable drive frame 192 which drives the stylus is free and maintained in operating alignment in the stylus bushing 152. The opposite end of the frame 192 forms a plug or driven clutch member 193, is threaded as at 194 to be securely fastened in the common driven member 196 of the double clutch 172, and is toothed at 198 to form an engaging face for one end of the double clutch mechanism. A shoulder 200 is formed on the common driven member 196 to engage a like bearing surface formed on the lower chart retainer to position the double clutch mechanism longitudinally of the caliper housing H.

Within the space between sections 5 and 6 maintained by the retaining collar 166 (Figs. 5, 12 and 13), the double clutch driven member 196 is externally fashioned to project into section 6 with sufficient clearance for free rotation. In this end, another threaded plug or driven clutch member 202 with toothed surface 204 similar to the threaded end of the drive frame 192 is firmly screwed into the driven member 196. Both of these threaded plugs or driven members 193 and 202 are centrally drilled to permit the first drive shaft 108 and the second drive shaft 206 to enter the double clutch 172 as separate driving members. These plugs are drilled large enough to permit the separate drive shafts to turn freely of the plugs and independently of each other, as shown in Figs. 12 and 13 of the drawing.

A pair of driving clutch members 208 and 210 are keyed, respectively, to the separately operated drive shafts 108 and 206. They are toothed or otherwise constructed to engage the faces of driven members 193 and 202 which they respectively oppose. A coil spring 209 is compressed between driving clutch members 208 and 210 within the double clutch driven member 196 constantly urging these members apart and into operating engagement with the driven members 193 and 202.

Figure 6:
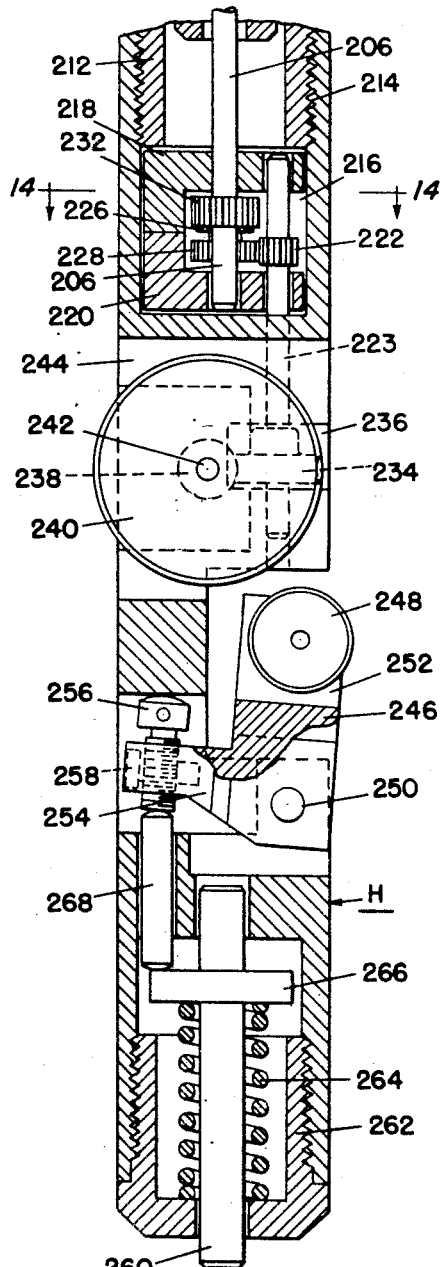
Figure 6 is a sectional elevation of that portion of Figure 1 between lines 6—6.

The tail-end driving mechanism section noted as section 6 of Figure 1 and detailed in Figures 6 and 14 closes the bottom of the housing H and completes the device. The second drive shaft 206 projects into this section through the male connector 212 which is similar to other threaded connectors mentioned above. The retaining collar 166 for the chart chamber housing halves 158 and 160 is flexibly held by the connector pins 168, 169 and 170 positioned by this connector 212 as shown in Figures 5 and 6. In section 6 the housing is threaded as at 214 to engage connector 212.

As was described above in detailing the head-end drive mechanism, the housing is jointed to facilitate the installation and maintenance of a tail-end transmission 216. The flexibility of the device is likewise maintained by repeating the structure already used consisting of a second gear cage formed by opposed mounting plates 218 and 220 in which are assembled gears of predetermined ratio. Figure 14, a cross-section of Figure 6 through the gear train, shows such a relationship and the feature of interchangeability. As in Fig. 8, which shows the head-end transmission, the tail-end transmission includes a drive shaft 223 mounting a drive gear 222. An intermediate shaft 224 on which are arranged gears 226 and 228 (Fig. 14) is arranged to transmit the motion to the drive shaft 206 through to the driven gear 232.

Fixed to the drive shaft 223, a worm gear 234 is positioned within the offset slotted portion 236 to engage a worm 238. The transverse slot 244 houses the tail-end friction drive wheel 240, rotatably supported on its axle 242, which also supports the worm 238 in engagement with the worm gear 234.

A bell-crank lever 146 and loading wheel 248, pivotally supported at 250 on the outwardly extending arm 252 thereof, repeat the head-end structure. The inwardly extending arm 254 including the adjusting screw 256 and cap screw 258 also repeat that construction. To urge the bell crank outwardly extending arm 252 to carry the wheel 248 into contact with the tubing wall, a piston 260 is slidably retained in the bottom of the housing H by threaded plug 262. Spring 264 abuts the plug 262 and a flange 266 on the piston 260 forcing the bell crank lever arm to pivot outwardly by means of the transfer rod 268.

*Operation*

It will be evident that the calipering instrument herein disclosed will operate under any condition where it is possible one of the driving wheels may become disengaged. To emphasize the accuracy of which this instrument is capable, however, only one use will be described. The operation selected involves the calipering of tubes in stock piles as they are arranged either in storage or on the job.

The tubing may be arranged horizontally, vertically, or any slope between these two extreme positions. Further, it may be reduced to the least length possible, or it may be coupled into pieces of several of these lengths. The dual-drive mechanism, which comprises the particular improvement in this invention, is arranged to give an accurate caliper record under any of these conditions.

By disengaging the coupler 22 from the caliper housing H, the operating line 20 may be passed from one end of a stock-piled tube to the other. The dogs 24 are easily depressed to receive the head 26 of the housing H and the caliper made ready for the operation. As the head-end of the caliper is pulled into the tube by the operating line 20, the chart drive mechanism does not operate until the head-end drive wheel 66 frictionally engages the tubing inner wall. Just prior to drive wheel 66 entering the tube, loading wheel 58 engages the tubing and, in addition to positioning the longitudinal axis of the caliper in line with the center-line of the tubing, forces the drive wheel to cooperate with the tube wall. The caliper then moves further into the tube, the chart mechanism operating, but no calipering being accomplished until the feelers 112 engage the tubing wall.

When the feelers contact the tubing wall the chart has been marked by the stylus 182 as it rotates and moves longitudinally of the chart member on the fixed threaded stylus rod 146. Simple rotation, by hand, of either of the drive wheels will also indicate a point of beginning on the chart. Rotation of the stylus holder 186 is accomplished by like movement of the drive frame 192 driven through the double clutch 172.

The rotary motion imparted to the drive wheel 66 by the caliper moving through the tubing causes shaft 74 to rotate through the contacting worm 70 and worm gear 72. The gear train in transmission 76 transmits a predetermined ratio of rotary movement to the shaft 96 and through the separating connector 98 to the first drive shaft 108.

Referring to Figures 4 and 5, and sectional views shown in Figures 9, 10, 11, 12, 13 and 15, the first drive shaft 108 is seen to pass freely through these sections to keyed engagement with driving clutch member 208 of the double clutch 172. As the member 208 is urged into contact with the toothed surface 198 of driven member 193, the double clutch common driven member 196 is rotated. The drive frame 192 is likewise rotated to move the stylus.

As the feelers 112 trace the pits and depressions of the inner surface of the tubing, that feeler which moves outwardly the greatest distance depresses the stylus rod 144 the greatest extent. This result is always the same regardless of the movement of any or all of the remaining feelers. Consequently, the deepest depression or pit at any point in the tubing is sensed and this fact, together with the measurement thereof, transmitted to the lead screw portion 146 of the stylus rod 144. The stylus holder 186 and the lead screw 146 being threadedly engaged, the vertical movement of the stylus in the chart chamber, with exception of the reciprocation due to feeler action, is determined by the pitch of the threads. Scribed on the chart, the record assumes a helix of closely parallel lines with vertical interruptions showing the relative location and depth of the encountered pits and depressions.

The continued pull on the caliper brings the tail-end drive wheel 240 into operating engagement with the tubing wall and rotates the second drive shaft 206. Worm 238 and worm gear 234 cooperate with drive wheel 240 and shaft 223 to transmit driving operation through the gears in transmission 216 similarly to the operation described for the head-end drive assembly. By selecting gears of proper ratio, the tail-end drive shaft 206 can be required to rotate at any selected speed relative to the first drive shaft 108 as they meet in the double clutch 172. In this example, however, the number and pitch of the gear teeth are so selected as to take the drive away from the head-end assembly and require the tail-end assembly to drive the chart. In this way, the calipering operation, so far as the chart drive elements are concerned, is assumed and finished by the tail-end drive as it is the last of the operating elements to leave the tubing.

Undue strain between the separate driving elements and the feeler mechanism is avoided by the flexible joint afforded in the use of connector pins 168, 169 and 170 at the double clutch section. This feature described in relation to Figure 5 thus permits unhampered operation, and greater sensitivity, of the feelers in transmitting the information to the chart.

To clarify the operation generally described above, a more specific description of the actuating movement of the elements is given. The double clutch 172 is the means which shifts the chart operation from the separate driving ends and permits calipering for the full length of the tubing piece. Chart marking is thus commenced before the feelers begin the sensing operation, and continues after the feelers are disengaged from the tubing wall, thus calipering the complete tube length. Distinct driving force is brought to the double clutch through the opposite ends of the driven member 196. The driving shafts 108 and 206 (referred to as the first and second drive shafts respectively) are separated and transmit their respective rotary motions to the driven member 196 of the double clutch 172 only through the clutch members 208 and 210 respectively. These two members, 208 and 210, are keyed to their respective driving shaft sections and are urged into driving engagement with the driven member 196 by the compressed spring 209. This clutch structure at the flexible joint gives full articulation to the otherwise rigid housing, increasing the accuracy and sensitivity of the feeler operation.

As the first drive shaft 108 is rotated by the head-end drive mechanism as disclosed, the driven member 196 is rotated by clutch member 208. This motion continues until the second drive shaft 206 picks up the driving operation by slightly increasing the speed of rotation. Chart drive is dominated by this tail-end operation and tends to rotate the head-end assembly at a faster rate. As the wheel 66 is engaging the tubing wall and rotates only as fast as the relative movement between caliper and tube permit, there is lost motion which must be absorbed. Any difference in operating speed in the drive shafts must be absorbed in the double clutch. However, as the speeds of the drive mechanisms differ only slightly when delivered to the clutch members, slippage of a tooth or two in the double clutch will compensate the speed differences. This is accomplished by the shape of the engaging clutch teeth and inclusion of spring 209.

Depending on the pitch of the screw threads on the lead screw 146 and the length of the chart chamber 176, many calipering passes may be made on the same chart. This permits repeated calipering in one tubing piece for exceptional coverage or passes through many successive lengths. Each record is easily separated on the chart by manipulation of the feelers or by rotation of the drive wheels already suggested to secure a distinctive chart record by reciprocation or movement of the stylus. Such marks may be used to indicate the beginning and end of the operation; or to numerically designate successive calipering operations.

In view of the above, it will be clear that the several objects of the invention are achieved and other advantageous results obtained.

As many changes could be made in carrying out the above constructions without departing from the scope of the invention, it is intended that all matter contained in the above description or shown in the accompanying drawing shall be interpreted as illustrative and not in a limiting sense.

I claim:

1. An internal tube wall calipering and recording device comprising a housing, a plurality of feelers mounted circumferentially about said housing, recording means in said housing responsive to the movement of said feelers, and dual driving means for said recording means including frictional tube engaging wheels mounted on the housing in spaced relation to the feelers and on each side thereof.

2. An internal tube wall calipering and recording device comprising a housing; recording means in said housing; feeler means extending from the housing into engagement with the tubing wall; feeler motion transmission means between said feelers and the recording means; and driving means for said recording means including spaced apart frictional tube engaging wheels mounted in the housing on each side of the feeler means, separate drive shafts operably connected to said wheels, and motion transmitting means connecting the drive shafts and the recording means.

3. The device as set forth in claim 2 further characterized in that the motion transmitting means connecting the drive shafts and recording means includes opposed clutch drive members on the adjacent ends of said separate drive shafts, driven clutch members operably positioned for engagement with the drive members adapted to freely rotate about said shafts, resilient means urging said clutch members apart and into separate engagement with the respective driven members, and a common driven member connecting said driven members with the recording means.

4. An internal tube wall calipering and recording device comprising a housing, feeler means extending from the housing into contact with the tubing wall, recording means including a fixed chart and a stylus rotatably and reciprocably operative relative thereto, reciprocal means connecting the feelers and the stylus, and drive means to rotate the stylus including a pair of frictional drive wheels mounted in said housing one above and one below the feelers and each positioned for operating contact with the tubing, clutch means, an upper rotatable shaft for connecting the upper drive wheel with said clutch means, a lower rotatable shaft for connecting the lower drive wheel with said clutch means, and motion transmitting means from said clutch means to the stylus.

5. An internal tube wall calipering and recording device comprising a housing, feeler means extending from said housing into contact with the tubing wall, recording means including a chart and stylus relatively rotatable and reciprocable, feeler motion transmitting means connecting the feeler means and reciprocable element of the recording means, frictional drive wheels above and below the feeler means in the housing extended to contact the tubing, and motion transmitting means for independently connecting each drive wheel with the rotatable element of the recording means.

6. The device as set forth in claim 5 further characterized in that the motion transmission means includes clutch means for separately transmitting motion from each drive wheel to the recording means.

7. An internal tube wall calipering and recording device comprising a housing divided into two operating sections, a plurality of feelers mounted circumferentially about said housing, recording means in the housing responsive to the movement of said feelers, drive means for said recording means in each of said sections including frictional tube engaging wheels and motion transmitting means for independently transferring the motion of each drive wheel for operation of the recording means, clutch means for separately transmitting the movement of the independent transmitting means to the recording means, and a flexible joint in said housing connecting the two operating sections at the loci of said clutch means to permit articulated movement of said sections.

8. In an internal tube wall calipering and recording device, the combination with a housing, a multiplicity of feelers mounted circumferentially about said housing, a recording device comprising a rotatable chart, a nonrotatable stylus rod movable axially in response to the movement of the feelers and a stylus in threaded engagement with said rod and thus movable axially: of separate shafts and driving connections therefrom operable to impart rotary movement to the chart, two frictional tube-engaging wheels mounted in the housing, one in advance of, and the other back of, the feelers, and separate driving connections from said wheels to the separate shafts, whereby in the travel of the caliper through the tubing the rotation of the recording chart is controlled before and during the earlier part of the calipering by one driving wheel and its shaft and during the later part of the calipering and afterward by the other driving wheel and its shaft, whereby calipering and recording may be effected from one end to the other of the tube regardless of its length.

References Cited in the file of this patent

UNITED STATES PATENTS

| | | |
|---|---|---|
| 1,890,607 | Hite | Dec. 13, 1932 |
| 2,578,236 | Fredd | Dec. 11, 1951 |
| 2,596,924 | Fredd | May 13, 1952 |
| 2,640,271 | Boucher | June 2, 1953 |